June 9, 1959
M. R. WATSON
2,890,061
GOLF CLUB CONTAINER AND CART
Filed Dec. 3, 1956
2 Sheets-Sheet 1
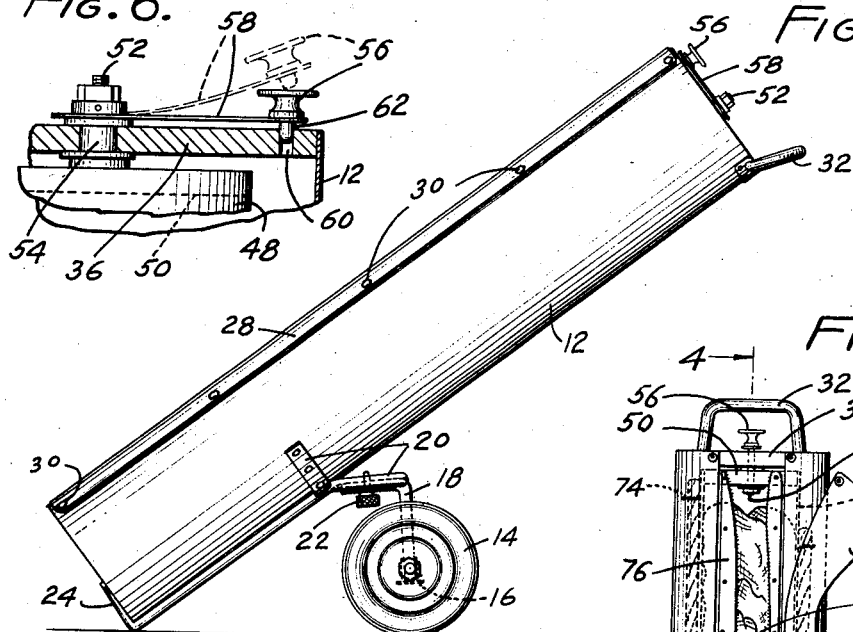
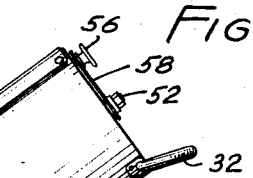
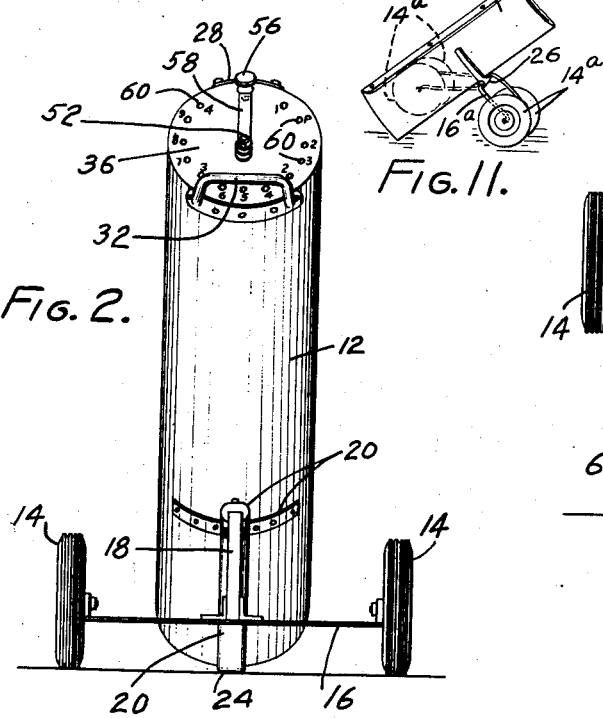
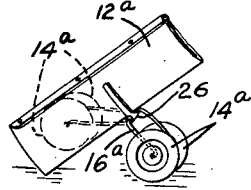
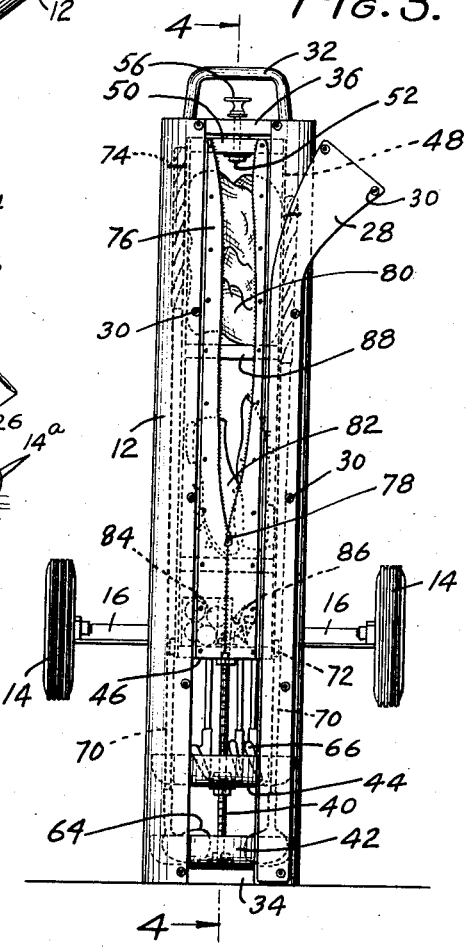
INVENTOR.
MELVIN R. WATSON
BY
ATTORNEY

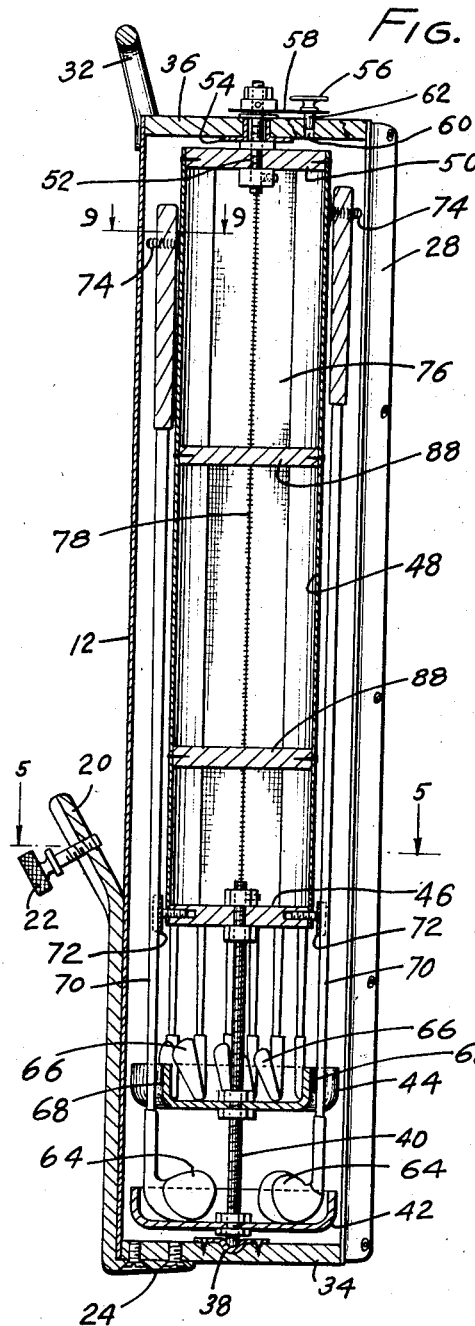
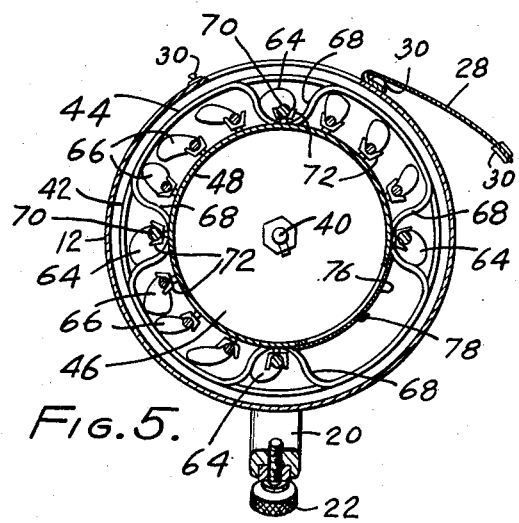
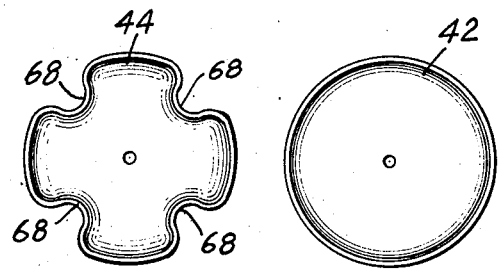
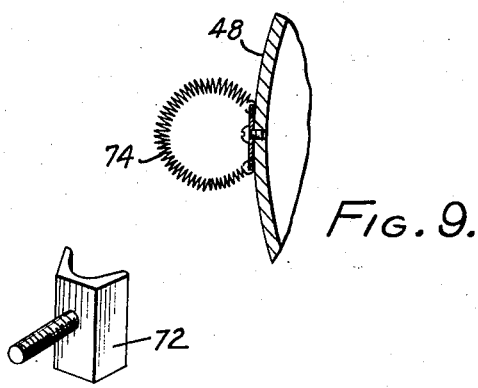
June 9, 1959  M. R. WATSON  2,890,061
GOLF CLUB CONTAINER AND CART
Filed Dec. 3, 1956  2 Sheets-Sheet 2
FIG. 4.
FIG. 5.
FIG. 7.
FIG. 8.
FIG. 9.
FIG. 10.
INVENTOR.
MELVIN R. WATSON
BY
ATTORNEY

United States Patent Office 2,890,061
Patented June 9, 1959

2,890,061

GOLF CLUB CONTAINER AND CART

Melvin R. Watson, San Fernando, Calif.

Application December 3, 1956, Serial No. 625,926

2 Claims. (Cl. 280—47.26)

This invention relates to an improved golf club container and cart and has for one of its principal objects the provision of a device of the class described, which will combine, in a unitary structure, a cart for carrying the golf clubs and accessories and a container having a dial, whereby the golfer may, by moving a knob, select the particular club which he desires to use at the moment.

Another object of the invention is to provide a combined golf club container and cart which can be easily manipulated and which is so constructed that the wheels, which support the same, can be readily removed or swung into inoperative position for an easier storing or transporting of the cart and container.

A further important object of the invention is the provision of a combination golf club container and cart which is so constructed that the clubs and other golfer's accessories, such as balls, tees, shoes, sweaters, rain jackets, and the like will be wholly and completely protected against the weather, either sunshine or rain, dirt, dust and the like, and regardless of whether in actual use or in storage.

Yet another important object of the invention is to provide a simple compact arrangement for carrying a full set of golf clubs and practically all of the usual accessories in a combination cart and container, which will also be adapted for the ready selection and quick removal of any club whenever desired and the simple replacement thereof after its use, while at the same time affording a ready access to the accessories which are in the same container.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved golf club container and cart of this invention.

Figure 2 is an end view of the structure as depicted in Figure 1 and illustrating the club selecting means.

Figure 3 is a plan view of the container and cart of this invention showing the same as set up on one end and, with the cover open, allowing access to the interior.

Figure 4 is a slightly enlarged sectional view taken on the plane of the line 4—4 of Figure 3, looking in the direction indicated by the arrows.

Figure 5 is a horizontal section on the line 5—5 of Figure 4 looking in the direction indicated.

Figure 6 is a detail view showing the construction and operation of the club selecting device.

Figure 7 illustrates one of the club-supporting elements.

Figure 8 illustrates another of the club-supporting elements.

Figure 9 is an enlarged detail view on the sectional line 9—9 of Figure 4, but with the club handle and other parts omitted.

Figure 10 is a perspective view of one of the elements which assists in supporting a club shaft.

Figure 11 is a view of the wheel supports for the container, illustrating a slight modification of the construction.

As shown in the drawings:

The reference numeral 12 indicates generally the container of the improved golf club carrying cart of this invention and, as shown, this is preferably cylindrical in shape and of a length and diameter to accommodate a full set of golf clubs; namely, four wood clubs and approximately nine iron clubs and a putter.

The container may be of metal, plastic or other suitable material and is obviously made as light as possible, while at the same time comprising the necessary inherent strength.

A pair of wheels 14 is provided for supporting the container 12, and these are mounted on an axle 16 which preferably comprises a leaf spring, whereby a desired cushioned ride is achieved.

A central support 18 extends upwardly from the spring axle 16 and is adapted to be removably fastened to a bracket 20 which is built onto the container 12, as best shown in Figures 1 and 2. The removable fastening element can be a winged nut or a knurled bolt 22, and the lower end of the bracket 20 extends downwardly to the bottom of the container 12 and is then bent upwardly, as shown at 24, in order to provide a ground riding element, thereby eliminating damage to the container 12 in the event that the same is inadvertently dragged over the playing surface of the course. Other means for removably mounting the wheels, the axle and the upright can obviously be employed. For example, the upright may be a square shaft which is adapted to be slidably fitted into a corresponding square opening in a downward extension of the bracket 20.

Also as shown in Figure 11, the wheels 14a can be mounted on a U-shaped spring or other axle 16a and connected to the container 12a by means of a hinge 26 whereby the wheels 14a can be folded back into the dotted line position shown in this figure; and, with the wheels thus folded, the container can then be stored in a locker or in the trunk of an automobile or some other convenient and compact space.

It will be obvious that the container 12 can be set up on its end when the same is not being actually used for transporting the clubs and accessories, and in this position a cover comprising a flap or similar closure element 28 can be opened or partially or wholly removed, thereby permitting ready access to the interior.

This cover 28 can be of cloth, plastic or even of metal; and in the event of the employment of metal, it can be slidably or otherwise shifted to one side for opening and closing purposes. Ordinarily, the cover 28 is held in position by snap fasteners 30 or by some other similar means.

The cylinder 12 is provided with a handle 32 by means of which the cart can be transported over a golf course with relative ease, and the wheels 14 are so positioned with respect to the cylinder 12 and its contents that the weight is substantially balanced over the axle 16, whereby the cart can be manipulated by its handle 32 with little or no effort or consciousness of weight.

The cylinder or container 12 is fitted with a bottom 34 and a top piece or closure 36. A recess or bearing plate 38 is fitted into the center of the bottom 34, and a shaft 40 is rotatably mounted in this recessed bearing plate. This shaft is screw threaded for the adjustable reception and support of two cup-shaped elements 42 and 44 (Figures 4, 7 and 8), and the upper end of the shaft 40 is fitted into a disc 46, which forms the bottom of an inner cylindrical container 48. This container 48 can likewise be of any suitable material and is provided with a top piece 50. This top piece 50 has a central pin or shaft 52 fitted into a bearing or support 54 which itself is centrally positioned in the outer cover 36 of the container 12.

This shaft 52 extends through the bearing 54 and beyond the upper face of the cover 36. The extending end is provided with an operating handle which includes a knob 56 and a leaf spring connection 58 to the shaft 52. The knob 56 and the spring handle 58 are fastened to the shaft 52 and this shaft is fitted into the plate 50 in such a manner that rotation of the knob will rotate the inner container 48 about its pivots 40 and 52.

A series of openings 60 is provided in the cover 36 and the knob 58 is provided with an integral lower extension 62 which can be fitted into any one of the openings 60, as these are all spaced in an arcuate relationship about the center of the cover 36. In this manner, the knob 56 can be used to rotate the inner container 48 about its central pivot points and the extension 62 of the knob can be selectively fitted into any one of the openings 60 for a temporary setting. These openings are marked to identify the various clubs in the container or case 12 as used by the golfer, and as best shown in Figure 2, the numbers 1, 2, 3 and 4 spaced inside the circle of openings 60 indicate the clubs generally known as wood clubs. The numbers outside the ring of opening 60 indicate the clubs generally known as iron clubs and are designated by the numbers 2 through 9 inclusive. The letter P represents the opening for the putter. Space may be provided for additional clubs.

As indicated, the various clubs are adapted to be placed inside the cylinder or case 12 and removably fastened to the outside surface of the inner container 48. The heads of the wood clubs 64 are adapted to rest in the lower cup-shaped support 42 as best shown in Figure 4, and the heads 66 of the iron clubs are adapted to rest in the cup-shaped container 44.

As shown in Figures 5 and 7, the cup-shaped container 44 is recessed about its periphery, as indicated at 68, for the suitable reception and by-passing of the shafts 70 of the wood clubs 64; and a number of shaft contacting elements 72 are spaced around the periphery of the container 48, whereby the individual shafts of all the clubs are yieldably maintained in desired position when properly placed in the container. One of the supports 72 is shown in perspective in Figure 10, but other embodiments thereof may be employed.

A series of spring wire loops is attached to the upper outer face of the container 48, as illustrated at 74 in Figures 4 and 9, and these are adapted to suitably grip and retain the handles of the respective club shafts.

A flexible cloth or similar closure element 76 is fitted into an elongated opening in the inner container 48, and this is closed by some suitable removable fastening means such as what is commonly known as a "zipper" 78. In this manner the cover 76 can be readily opened and closed; and various articles such as a sweater or a jacket 80, shoes 82, golf balls 84, tees 86 and other appurtenances and equipment can be readily contained in the inner cylinder 48. Access to the interior thereof is gained by positioning the pin 62 of the knob 56 in an opening provided for that purpose, as shown in Figure 2, and partitions 88 are provided for separating the container 48 into respective compartments.

It will be evident that herein is provided a combination golf club and accessory container and carrying cart, which, in addition to providing a satisfactory, readily sealed and simply operated recepticle for these various elements, also comprises a suitable carrying cart for the equipment, which cart can, by either removing the wheels or shifting them into inoperative position, be adapted to conform to a relatively small storage space or an automobile trunk for transportation to and from the golf course. The device is compact, will easily contain a full complement of clubs and equipment, is light and easily handled and the selection of any desired club is easy and accurate. A simple movement of the knob 56 and a positioning of its pin 62 in a designated opening 60 will immediately bring the desired club into position adjacent the opening in the container 12, whereupon it can be readily removed and used, and as readily replaced.

Furthermore, all the clubs and other contents are properly protected against wear, scuffing, scratching or other damage due to contact with each other or other portions of the equipment, and the apparatus, being readily portable, will prove quite a boon to the golfer who desires to carry a full quota of clubs and other equipment without unduly tiring himself or employing an expensive caddy. The cost of this apparatus will be soon made up in savings of caddy fees, damage to clubs, loss of garments, balls and the like.

I am aware that many changes may be made and numerous details of construction varied throughout a wide range without departing from the principles of this invention; and I, therefore, do not propose limiting the patent hereon otherwise than as necessitated by the prior art.

I claim as my invention:

1. A golf club container and cart, comprising in combination, an open compartment for the clubs, a closure for the compartment, a handle at one end of the compartment, a pair of wheels removably mounted adjacent the other end of the compartment, a support for the various golf clubs rotatably mounted inside the compartment, means for turning the support positioned at the top of the compartment and exteriorly thereof, the top of the compartment including indicia for selectively positioning a desired club adjacent the opening in the compartment, the means for rotating the club support including a leaf spring connected to the pivotal mounting for the club support, a knob at the end of the spring, a number of openings circularly disposed in the container cover, the knob having a pin to be fitted into a desired opening, the inner support for the clubs including a container for golfer's accessories, a closure for the inner container, the support for the clubs including a pair of cup-shaped receptacles in the lower end of the container, one of said receptacles adapted to receive the heads of the wood clubs, and the other receptacle to receive the heads of the iron clubs, additional supporting and gripping means for the club shafts on the outer face of the inner rotatable support and container, said shaft supporting and gripping means comprising coiled spring loops, the shaft contacting means comprising grooved protuberances spaced about the lower peripheral edge of the rotatable support.

2. A device as described in claim 1, wherein the removable mounting for the wheels includes a knurled bolt, the wheels being mounted on a combination spring and axle.

References Cited in the file of this patent

UNITED STATES PATENTS

| | | |
|---|---|---|
| 1,150,389 | Ryley | Aug. 17, 1915 |
| 1,432,284 | Gearhart | Oct. 17, 1922 |
| 2,435,893 | Mall | Feb. 10, 1948 |
| 2,547,829 | Mills | Apr. 3, 1951 |
| 2,551,009 | Kaltenbach | May 1, 1951 |
| 2,590,178 | Jamison | Mar. 25, 1952 |
| 2,629,609 | Wilson | Feb. 24, 1953 |
| 2,699,951 | Gans | Jan. 18, 1955 |
| 2,722,431 | Victor | Nov. 1, 1955 |
| 2,740,684 | Haralson | Apr. 3, 1956 |
| 2,760,782 | Hartzell | Aug. 28, 1956 |
| 2,806,711 | Jacobs | Sept. 17, 1957 |